United States Patent
Digonnet et al.

[11] Patent Number: 5,920,666
[45] Date of Patent: Jul. 6, 1999

[54] STABLE NONLINEAR MACH-ZEHNDER FIBER SWITCH

[75] Inventors: Michel J. F. Digonnet; H. John Shaw, both of Palo Alto; Richard H. Pantell, Menlo Park, all of Calif.; Robert W. Sadowski, Camp Doha, Kuwait

[73] Assignee: The Board of Trustees for the Leland Stanford Junior University, Stanford, Calif.

[21] Appl. No.: 09/000,939

[22] Filed: Dec. 30, 1997

Related U.S. Application Data

[60] Provisional application No. 60/034,598, Jan. 2, 1997, and provisional application No. 60/035,062, Jan. 17, 1997.

[51] Int. Cl.$^6$ .................................................... G02B 6/26
[52] U.S. Cl. ................................ 385/16; 385/14; 372/6
[58] Field of Search .................................... 385/42, 96, 2, 385/3, 4, 8, 9, 14, 10, 16, 17, 20, 21, 24, 132, 141, 142, 122; 372/6

[56] References Cited

U.S. PATENT DOCUMENTS

| | | |
|---|---|---|
| 4,389,090 | 6/1983 | LeFevre . |
| 5,119,453 | 6/1992 | Gonthier et al. . |
| 5,276,743 | 1/1994 | Chinn ........................................ 385/13 |
| 5,307,428 | 4/1994 | Blow et al. ................................ 385/11 |
| 5,311,525 | 5/1994 | Pantell et al. . |
| 5,390,157 | 2/1995 | Revelli, Jr. ................................ 385/14 |
| 5,479,546 | 12/1995 | Dumais et al. . |
| 5,703,975 | 12/1997 | Miller et al. .............................. 385/16 |
| 5,754,714 | 5/1998 | Suzuki et al. ............................. 385/14 |
| 5,841,912 | 11/1998 | Mueller-Fiedler et al. ................ 385/7 |

OTHER PUBLICATIONS

F. Gonther, et al., "Wavelength–flattened 2x2 splitters made of identical single–mode fibers", Optical Society of America, Aug. 1, 1991, vol. 16, No. 15, Optics Letters, pp. 1201–1203.

R. H. Pantell, et al., "Analysis of Nonlinear Optical Switching in an Erbium–Doped Fiber", IEEE, Sep. 9, 1993, vol. 11, No. 9, pp. 1416–1424.

R. W. Sadowski, et al., "All–optical switching using color centers in irradiated silica fibers" SPIE, 1994, vol. 2289, Doped Fiber Devices and Systems, pp. 110–116.

R. W. Sadowski, et al., "All–Optical Switching Using Color Centers in an Irradiated Phosphorus–Doped Fiber", IEEE, Jul. 7, 1996, vol. 8, No. 7, pp. 897–899.

*Primary Examiner*—Akm E. Ullah
*Attorney, Agent, or Firm*—Knobbe, Martens, Olson & Bear, LLP

[57] ABSTRACT

An all-optical fiber switch is implemented within a short Mach-Zehnder interferometer configuration. The Mach-Zehnder switch is constructed to have a high temperature stability so as to minimize temperature gradients and other thermal effects which result in undesirable instability at the output of the switch. The Mach-Zehnder switch of the preferred embodiment is advantageously less than 2 cm in length between couplers to be sufficiently short to be thermally stable, and full switching is accomplished by heavily doping one or both of the arms between the couplers so as to provide a highly nonlinear region within one or both of the arms. A pump input source is used to affect the propagation characteristics of one of the arms to control the output coupling ratio of the switch. Because of the high nonlinearity of the pump input arm, low pump powers can be used, thereby alleviating difficulties and high cost associated with high pump input powers.

34 Claims, 5 Drawing Sheets

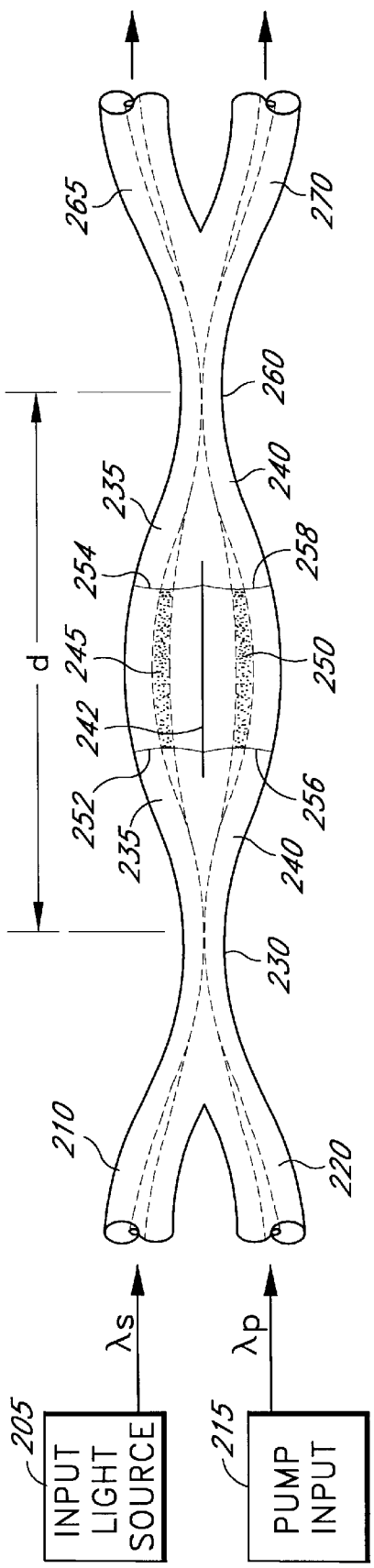
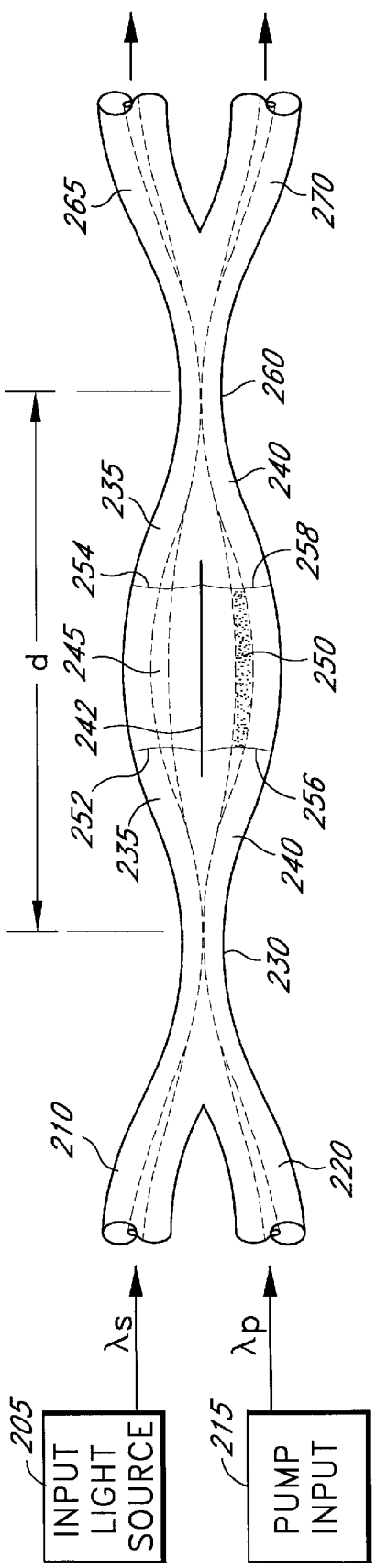

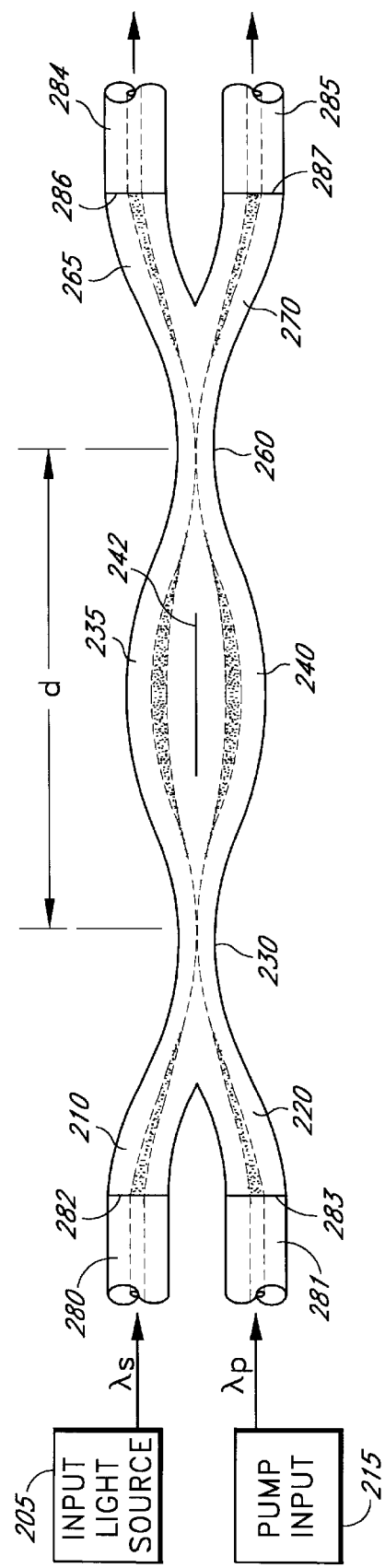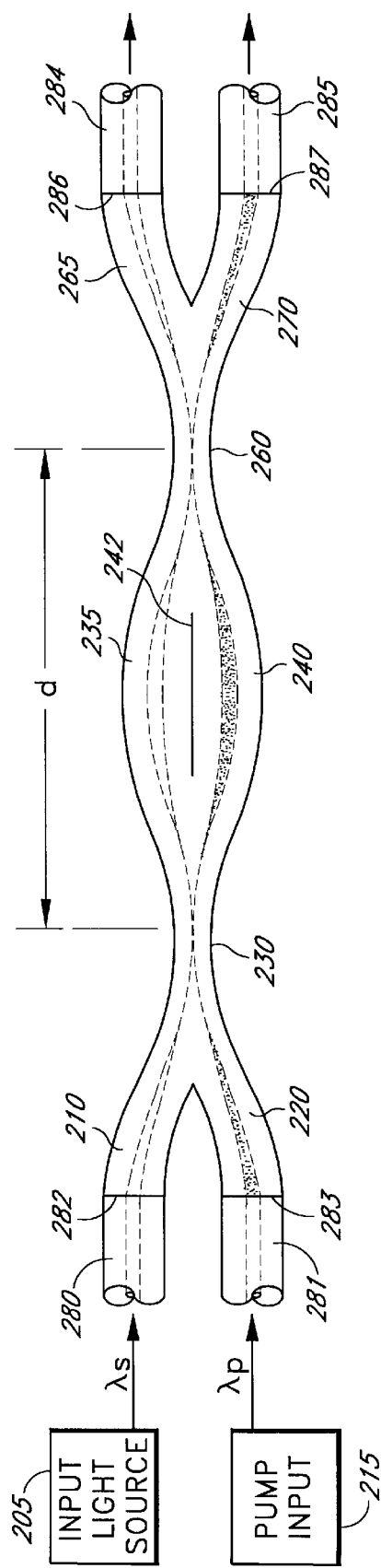

STABLE NONLINEAR MACH-ZEHNDER FIBER SWITCH

RELATED APPLICATIONS

This application claims the benefit of priority under 35 U.S.C. § 119(e) of U.S. Provisional Application No. 60/034,598, filed on Jan. 2, 1997, and U.S. Provisional Application No. 60/035,062, filed on Jan. 17, 1997.

BACKGROUND OF THE INVENTION

1. Field of the Invention

The present invention relates to optical switches and, in particular, to Mach-Zehnder fiber switches.

2. Description of the Related Art

Optical switches are well known in the art, and are anticipated to have extensive applications in fiber optic communication and sensor systems. A particularly preferred kind of optical switch is an all-optical switch, wherein the actual switching of light from one output port to another output port is accomplished without mechanical or electrical switching, but rather by the input of an optical pump signal from a switching light source.

In the basic configuration of a Mach-Zehnder interferometer switch, an optical signal is provided as an input signal to the switch. The input signal is divided at an optical coupler and is caused to propagate in substantially equal portions in two arms of an interferometer. The two portions are recombined at a second coupler, and the two output ports of the second coupler are the two output ports of the switch. If the light portions recombining at the second coupler are in phase, the two portions constructively interfere at one output port of the second coupler and are output at that output port. If, on the other hand, the two light portions are not in phase, and in particular, if the two light portions incur a $\pi$ differential phase shift, the two light portions combine constructively at the other output port of the second coupler and are output at that output port. By controlling the differential phase difference between the two light portions, the optical signal can be selectively switched to be output at either of the two output ports.

The control of the differential phase shift is accomplished by inputting an optical pump signal into the interferometer switch. The optical pump signal has a different wavelength than the optical signal, and, by using a wavelength dependent multiplexing coupler, the pump light is caused to propagate in only one of the two arms between the two couplers. The pump light changes the propagation characteristics of the arm in which the pump light is propagating and causes the signal light portion propagating in that arm to incur a phase shift different from the phase shift of the signal light portion propagating in the other arm. By selecting the intensity of the pump light, the phase shift can be set to be equal to $\pi$ and the output light is switched between the two ports, as discussed above. The pump light can be selectively turned on or turned off to cause the signal light to be switched or not to be switched. More details regarding the operation of the pump signal in causing the switching will be discussed below.

A number of problems have been encountered in known interferometric switches. One problem has been to be able to construct the interferometer such that the two signals have a stable phase difference of 0 or $\pi$ in the absence of the pump signal. Another problem is that the refractive indices of the two fiber arms vary with temperature, and, if the temperature variations of the two arms are not equal or if the optical paths of the two arms are not equal, the temperature variations cause variations in the differential phase shift. Furthermore, the temperature variations induced by the pump can be different for the two arms because the pump signal propagating in one arm heats up that arm, while the other arm is affected less or not at all by the heat from the pump signal.

Certain temperature-stable Mach-Zehnder interferometers have been developed; however, such interferometers have not heretofore been suitable for use as an all-optical fiber switch using the intrinsic Kerr effect of the fiber. This is because the small size of these temperature-stable Mach-Zehnder interferometers allows for only a very short fiber length between the two fused couplers. Thus, in order to induce the required $\pi$ differential phase shift over a very short fiber arm length using the Kerr effect, a very high pump power is required, which will induce catastrophic breakdown of the optical fiber. Thus, there continues to be a need for a temperature-stable Mach-Zehnder interferometer switch with a strong nonlinearity.

SUMMARY OF THE INVENTION

In accordance with the present invention, an all-optical fiber switch using a temperature-stable Mach-Zehnder interferometer is disclosed. In accordance with the preferred embodiment of the invention, a very high nonlinearity is produced within the fiber arms of the short, temperature-stable, Mach-Zehnder interferometers by introducing a suitable dopant with a very high concentration so that the pump power required to induce a $\pi$ differential phase shift is sufficiently low to avoid breakdown effects in the fiber.

One aspect of the present invention is an optical switch comprising a first optical coupler which receives an optical signal and a pump signal as inputs and provides first and second coupled outputs. A first optical waveguide is in optical communication with the first coupled output. The first optical waveguide has a first portion of the optical signal propagating through it. A second optical waveguide is in optical communication with the second coupled output. The second optical waveguide has the pump signal and a second portion of the optical signal propagating through it. The first and second optical waveguides are sufficiently short to (e.g., have lengths of less than two centimeters) to be thermally stable. The second optical waveguide further has a sufficient nonlinearity to produce a relative phase shift difference of the second portion of the optical signal with respect to the first portion of the optical signal of 180°. A second optical coupler is connected such that the outputs of the first and second optical waveguides are provided as inputs. The second coupler has first and second output ports, and an output signal is selectively provided from one of the first and second output ports in accordance with whether the pump signal is present or absent. Preferably, the first and second optical waveguides have lengths between one millimeter and one centimeter, and the pump power is on the order of 1–10 milliwatts.

Another aspect of the present invention is an optical switch which comprises a first optical coupler which receives an optical input signal and a pump signal as inputs and provides first and second coupled outputs. A first optical waveguide is in optical communication with the first coupler to receive the first coupled output. The first optical waveguide has a first portion of the optical input signal propagating through it. A second optical waveguide is in optical communication with the first coupler to receive the second coupled output. The second optical waveguide has the pump signal and a second portion of the optical input signal propagating through it. The first and second optical waveguides are sufficiently short (e.g., have lengths of less than two centimeters) to be thermally stable. A second optical coupler receives the first and second optical waveguides as inputs and selectively provides an optical output signal to first and second output ports. The second optical waveguide has a sufficient nonlinearity to induce a differential phase shift between the first and second portions of the optical signal to cause substantially complete switching of the optical output signal from the first output port to the second output port when a low input power of the pump signal is provided. Preferably, the first and second optical waveguides have lengths between one millimeter and one centimeter, and the pump power is on the order of 1–10 milliwatts.

Another aspect of the present invention is a temperature-stable, fiber, Mach-Zehnder optical switch which comprises a Mach-Zehnder interferometer having an input signal propagating therethrough so that a first portion of the input signal is coupled to a first output port and a second portion of the input signal is coupled to a second output port. A ratio between the power in the first portion and the sum of the powers in the first portion and the second portion defines a coupling ratio. The temperature stability of the interferometer is such that over a range of approximately −20° C. to 50° C., the coupling ratio does not vary more than about 0.2 dB. A pump input source supplies an input pump signal that effects a change in the coupling ratio to provide optical switching. The temperature stability of the interferometer is maintained in the presence of the pump signal without requiring active stabilization. Preferably, the temperature stability of the interferometer is such that over a range of approximately −20° C. to 70° C., the coupling ratio does not vary more than about 0.2 dB.

Another aspect of the present invention is a fiber, Mach-Zehnder interferometer for use as an all-optical switch. The interferometer comprises a first coupler which receives an optical input signal and a pump signal. The first coupler couples light to first and second fiber arms. A second coupler is in optical communication with the first coupler via the first and second fiber arms. The first and second fiber arms define optical propagation paths between the first and second couplers which paths are sufficiently short (e.g., have lengths of less than 2 centimeters) to be thermally stable. First and second output ports are in optical communication with the second coupler. The first fiber arm is doped with a dopant having a concentration and nonlinearity sufficient to effect full switching of the optical input signal from the first output port to the second output port when pump power on the order of 10 milliwatts or less is applied to said first fiber arm. Preferably, the dopant is erbium and has a concentration on the order of 50,000 parts per million. Alternatively, the dopant is neodymium and has a concentration on the order of 50,000 parts per million. In a further alternative, the dopant is ytterbium and has a concentration on the order of 50,000 parts per million.

Another aspect of the present invention is a fiber, Mach-Zehnder interferometer for use as an all-optical switch. The interferometer comprises first and second couplers which split and recombine an optical signal propagating through the interferometer. The first and second couplers have a propagation path therebetween which is sufficiently short (e.g., has a length less than two centimeters) so as to be thermally stable. A fiber arm within the propagation path has a nonlinearity sufficient to effect full switching of the optical signal at an output of the second coupler using a pump signal having an input power which is low enough to ensure that no damage is caused to the interferometer and to ensure that no deleterious thermal effects are observed.

Another aspect of the present invention is a method for using a short, fiber, Mach-Zehnder interferometer having first and second couplers, wherein a distance along a propagation path between the first and second couplers is sufficiently short (e.g., less than about two centimeters) so as to be thermally stable. The method comprises the steps of inputting an optical input signal into a first port of the interferometer; inputting a pump switching signal into a second port of the interferometer; and controlling the energy of the pump switching signal to effect switching of the optical input signal from one output port to another output port of the interferometer, thereby using the interferometer as an all-optical switch.

BRIEF DESCRIPTION OF THE DRAWINGS

FIGS. 2A, 2B, 2C and 2D schematically illustrate improved fiber Mach-Zehnder interferometers constructed in accordance with preferred embodiments of the present invention.

DETAILED DESCRIPTION OF THE
PREFERRED EMBODIMENT

Discussion of Prior Devices

Figure 1:
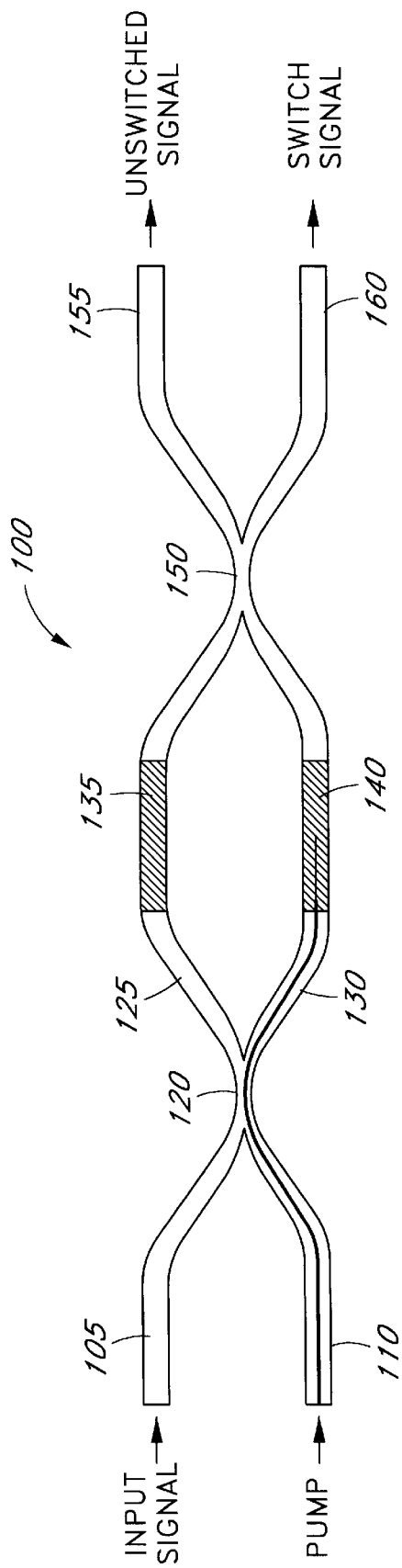
FIG. 1 schematically illustrates an exemplary prior art nonlinear Mach-Zehnder fiber interferometer switch.

Before describing the improved Mach-Zehnder interferometer switch of the present invention, additional background information regarding prior devices will be described. The basic configuration for a typical all-optical switch is shown in FIG. 1. The configuration of FIG. I is typically referred to as a Mach-Zehnder interferometer. As shown in FIG. 1, the Mach-Zehnder fiber interferometer switch 100 includes a first input arm 105 for receiving an input optical signal, and a second input arm 110 for receiving a switching pump signal. The input arms 105, 110 are fused together to form a coupler 120 which branches out into a first branch arm 125 and a second branch arm 130. As illustrated, the first branch arm 125 is preferably a continuation of the fiber which forms the first input arm 105, and the second branch arm 130 is preferably a continuation of fiber which forms the second input arm 110. In many instances, a portion 135 of the first branch arm 125 or a portion 140 of the second branch arm 130 or portions 135, 140 of both branch arms 125, 130 are treated to form nonlinear regions. The branch arms 125, 130 are once again fused to form a coupler element 150 which branches into a first (upper) output port 155 and a second (lower) output port 160. Preferably, the first output port 155 is a continuation of the fiber forming the first input art 105 and the first branch arm 135, and the second output port 160 is a continuation of the fiber forming the second input arm 110 and the second branch art 140.

In the passive form (i.e., in the absence of pump), the input signal, at wavelength $\lambda_s$, is fed into the input arm 105 and is split equally by the first coupler 120 into portions which enter the two branch arms 125, 130. As is well known in the art, the phase of the portion of the input signal entering the second branch arm 130 leads the phase of the portion of the input signal entering the first branch arm 125 by $\pi/2$. After traveling through the respective arms 125, 130, the two signal portions are recombined by the second coupler 150. If the two signal portions prior to entering the second coupler 150 have maintained the same relative phase difference (i.e., the phase of the signal portion in the second branch arm 130 leads the phase of the signal portion in the first branch arm 125 by $\pi/2$), the two signal portions recombine constructively in the second (lower) output port 160. That is, all of the signal comes out at the output port 160. However, if after traveling through the two branch arms 125, 130, the two signal portions incur a differential phase shift such that as the two signal portions enter the second coupler 150, the signal portion in the second branch arm 130 does not lead the phase of the signal portion in the first branch arm 125 by $\pi/2$ (modulo $2\pi$) (where, for example, $5\pi/2$ (modulo $2\pi$)=$\pi/2$) then the two signal portions will not combine constructively in the second output port 160. In particular, if the two signals incur a differential phase difference of $\pi$ (modulo $2\pi$) (where, for example, $3\pi$ (modulo $2\pi$)=$\pi$) such that the phase of the signal portion in the first branch arm 125 leads the phase of the signal portion in the second branch arm 130 by $\pi/2$ as the two portions enter the second coupler 150, then the two signal portions recombine constructively in the first output port 155 so that substantially all of the signal comes out of the first (top) port 155. If the differential phase shift incurred by the two signal portions while propagating through the first and second branch arms 125, 130 is intermediate (between 0 and $\pi$, or between $\pi$ and $2\pi$, etc.), then the phase difference between the two signal portions as the two signal portions enter the second coupler will not be $\pi/2$, and some of the signal will exit from the first output port 155, while the rest of the signal will exit at the second output port 160, where the ratio of powers in the signals is determined by the phase difference between them. This principle is well known, and many applications of Mach-Zehnder fiber devices have been reported in the literature using particular fused or polished fiber couplers to form the Mach-Zehnder interferometer fiber switch.

It is well known in the art that the behavior of this device as an interferometer depends strongly on the relative state of polarization of the two signals where they are recombined at the coupler 150. For maximum contrast, the two signals should have identical polarizations at that coupler. If they do not have identical polarizations when the two recombining signals are in phase, interference will not be completely constructive in output port 160, which means that not all the power will come out at output port 160, and the rest of the power will come out at output port 155. Similarly, when the two recombining signals are out of phase, interference will not be completely constructive in output port 155, which means that not all the power will come out at output port 155, and the rest of the power will come out at output port 160. Whereas the switch at the core of this invention can operate with the two recombining signals having somewhat different polarizations, it is preferable in general that they do exhibit identical polarizations. This can be accomplished in several ways. In a preferred embodiment, the switch is made of standard nonpolarization-maintaining fibers, but, as discussed below, the fibers are short enough that the state of polarization of the signal does not change significantly along the length of the Mach-Zehnder interferometer switch 100, so that the two signals recombining at coupler 150 have substantially the same state of polarization. In a second embodiment, the switch apparatus of FIG. 1 is made entirely of polarization maintaining fiber. In this case, the input signal at port 105 is polarized linearly and its polarization is aligned with either one of the two axes of the fiber. A third option, in case the fiber arms 125, 130 are long enough, is to incorporate fiber polarization controllers in one or both of the fiber arms. The function of fiber polarization controllers, as taught in U.S. Pat. No. 4,389,090, is to enable adjustment of the polarization of the signal in the fiber to any desired state of polarization. In the following discussion, one of these situations is implicitly assumed, so that polarization-related issues are avoided.

As briefly discussed above, one present application of a Mach-Zehnder interferometer fiber switch is all-optical switching. According to this application, one or both of the regions 135, 140 are made of fiber exhibiting nonlinear effects. For example, some applications use standard silica fiber (which has an intrinsic nonlinearity known as the Kerr effect), or a doped fiber having a dopant which introduces a strong optical nonlinearity. As is well known in the art, the Kerr effect is a phenomenon by which the refractive index of a fiber carrying an optical signal (at a wavelength of $\lambda_s$, for example) is slightly modified by the signal's own intensity or by other light signals at wavelengths other than $\lambda_s$ propagating through the fiber. To accomplish all-optical switching, a pump signal, at a wavelength $\lambda_p$ different from the wavelength $\lambda_s$, is injected into the second port 110. The first coupler 120 is designed to be a wavelength division multiplexer (WDM), such that while the signal at the wavelength $\lambda_s$ is split equally between both arms (i.e., the coupler exhibits a coupling ratio of 50% at $\lambda_s$), the pump, which has a different wavelength, $\lambda_p$, is not coupled to the upper arm 125 (i.e., the coupler exhibits a coupling ratio of 0% at $\lambda_p$). All of the pump power is thus coupled to the lower arm 130 of the Mach-Zehnder interferometer. Alternatively, the pump could be coupled 100% so that all the pump power is coupled to the upper arm 125.

In an alternate possible embodiment, the optical pump is coupled in via the input port 105 instead of the input port 110 (which can be accomplished via a WDM coupler placed on the fiber 105, not shown in FIG. 1). The coupler 120 is then designed to be a WDM coupler with a coupling ratio of 50% for the signal, as before, and a coupling ratio of 0% at the pump wavelength, so that substantially all the pump power goes into the upper arm 125. Alternatively, the coupler 120 can be designed to still have a coupling ratio of 50% for the signal, but a coupling ratio of 100% at the pump wavelength, so that substantially all the pump power goes into the lower arm 130. In the following, the operation of the first embodiment, shown in FIG. 1, is discussed with the understanding that the basic mode of operation is substantially identical for the two other alternative configurations discussed above.

Due to the nonlinear characteristics of the region 140 of the interferometer 100, the pump power modifies the index of the fiber core through the lower arm 130. By changing the index of refraction in the region through which the signal in the lower arm 130 is propagating, an effective change in the phase of the signal takes place. Briefly, the energy from the pump light is absorbed into the fiber region 140 causing electrons within the dopant to reach a higher energy level. This alteration of the dopant electronic configuration results in a modification of the index of refraction of the fiber core for wavelengths of light including the signal wavelength $\lambda_s$. When integrated over the length of the nonlinear region 140, the change of index induces a nonlinear phase shift δφ in the signal that has traveled through in the lower arm 130.

Since the signal in the lower arm 130 undergoes a phase shift of δφ, while the signal in the upper arm 125 does not undergo a phase shift (since no pump power enters into the upper arm so that the index of refraction of the upper arm remains substantially unchanged), a relative phase shift is induced between the signal in the upper arm 125 and the signal in the lower arm 130. In addition, a constant phase difference, known as the phase bias, exists between the two signals recombined in the coupler 150 due to the difference in the lengths of the two arms 125, 130. Consequently, where the two signals are recombined by the second coupler 150, their relative phase difference is now δφ plus some constant phase shift due to this difference in length. The sum of δφ and this constant phase difference is referred to hereinafter as Δφ.

Under the assumption that, in the absence of a pump input, the phase difference due to the difference in propagation lengths through the arms 125, 130 is adjusted to be zero (i.e., so that substantially all of the input signal comes out of the bottom output port 160), if the pump power is selected such that δφ=π, then in the presence of the pump substantially all of the signal power will exit through the top port 155 so that the input signal has been effectively switched from the bottom port 160 to the top port 155. It should be noted that this type of switch is not a latching switch since the input signal is switched only as long as the pump power is on. When the pump power is turned off, the signal output returns to the lower port 160 since the nonlinearity induced in the lower arm 130 ceases to become a factor.

A number of difficulties have been encountered in the development and implementation of such all-optical switches. For example, one difficulty is that in the absence of a pump input, the phase bias due to the differing lengths of the two arms 125, 130 must be set to a very precise value (e.g., 0). This requires careful control of the relative length of the two arms to a fraction of a wavelength. For typical arm lengths of many centimeters or more, this has been found to be quite difficult. This difficulty is typically eliminated by applying an external, steady-state phase shift with a phase modulator (not shown) placed in one of the Mach-Zehnder fiber arms 125, 130, thus setting the phase bias precisely to its desired value. This technique is well known in the art.

A second difficulty which has been encountered is that the phase bias is highly sensitive to external temperature variations. If the fiber lengths of the arms 125, 130 are not equal, even by only a few hundred wavelengths, and the temperature of the device is changed uniformly, both the indices and the lengths of the two fiber arms change by different amounts, which causes the phase bias to also change. The differences are caused in part by the expansions and contractions due to temperature variations which are proportional to the lengths of the fiber so that the longer arm will suffer a greater phase change than the shorter arm, thus causing a phase imbalance. This phase imbalance, in turn, modifies the signal power splitting ratio at the output ports 155, 160 of the Mach-Zehnder interferometer 100.

The interferometer 100 is also sensitive to temperature gradients. For example, if the temperatures of the two arms 125, 130 change by differing amounts due to the variations in the temperature gradients between the arms, the signal power splitting ratio at the output ports 155, 160 again changes, even if their lengths are precisely identical.

Both of the above-described temperature-dependent effects, which are present whether the Mach-Zehnder interferometer 100 is pumped or unpumped, are undesirable. In practice, these effects are reduced by making the fiber arms 125, 130 physically as close to each other and as short as possible (to minimize temperature gradients) and by making the fiber arm lengths as equal as possible (to minimize sensitivity to overall temperature changes) which is made easier in practice by keeping the two arms as short as possible.

Another method which has been employed to actively stabilize the output coupling ratio of the interferometer 100 is to use a control loop wherein the signal at one of the output ports is detected and compared to a reference which generates an error signal proportional to the difference between the reference and the detected output signal. This error signal is then amplified and fed into the same phase modulator (not shown) that sets the bias so as to apply just enough phase to dynamically zero the error signal. Although active stabilization of the bias works well, it is cumbersome, it increases the device cost, it requires access to the optical signal, and it leads to technical difficulties when the signal is dynamically switched. Most importantly, it requires electronic circuitry to run the switch, which is typically not acceptable for fiber sensor arrays or other applications for which a minimization of electrical connections is desirable.

Another undesirable effect in a Mach-Zehnder interferometer switch is due to the effects of the input pump power. More specifically, since the pump signal is applied only to one arm, heat may be generated by the pump within that arm which is not generated in the arm that does not carry the pump power. This temperature differentiation results in a pump-induced thermal phase shift that causes an imbalance in the coupling ratio for the Mach-Zehnder interferometer 100 when the pump is on. Because this effect is thermal, it is typically slow so that a few microseconds or more are required for this imbalance to vanish after the pump has been turned off. In some applications, this effect can be a significant problem.

In a Mach-Zehnder switch, thermal stability dictates that the two fiber arms have nearly identical lengths in order to minimize the effect of overall temperature changes. If the switch is to operate over a large temperature range (e.g., on the order of tens of degrees Fahrenheit), the splitting ratio of the two couplers forming the Mach-Zehnder interferometer switch should not vary with temperature. Furthermore, as discussed above, temperature gradients should be minimized.

One previous design of a temperature-stable fiber Mach-Zehnder interferometer has alleviated a number of the aforementioned problems. This Mach-Zehnder interferometer has been designed for use as a highly temperature-stable coupler where thermally induced variations in the coupling ratio are precisely counterbalanced by means of a dual coupler configuration. This coupler is disclosed in U.S. Pat. No. 5,119,453 to Gonthier, et al., issued Jun. 2, 1992, which is incorporated by reference herein. See also, F. Gonthier, D. Ricard, S. Lacroix, and J. Bures, "Wavelength-flattened 2×2 splitters made of identical single-mode fibers," *OPTICS LETTERS*, Vol. 16, No. 15, pp. 1201–1203, August 1991. The coupler is available from CANSTAR, of Toronto, Canada. Briefly, the miniature temperature-stable Mach-Zehnder interferometer disclosed in the patent is produced by forming two fused couplers which are substantially identical (i.e., they have substantially the same coupling ratios and the coupling ratios exhibit substantially the same temperature dependency). The temperature-stable Mach-Zehnder interferometer is fabricated from two strands of fiber, laid side-by-side in contact with each other. The fibers are then fused together, first at one place to form the first coupler, and then at about 1 millimeter further along the fibers, the two fibers are fused again to form the second coupler.

When the two fiber lengths are precisely equal and the two couplers have substantially similar 50/50 coupling ratios, it can be shown that heating the two couplers by the same amount will imbalance the interferometer, because the coupling ratios change. However, it can be shown that this effect is avoided when a $\pi$ phase shift exists between the two arms (i.e., if the length of the two arms differ by half of a wavelength). When the two arms differ by half of a wavelength, the nearly identical variations in the coupling ratio of the two couplers cancel one another. This compensation scheme is implemented by first fabricating a balanced Mach-Zehnder interferometer. Thereafter, a $\pi$ phase shift is introduced between the two arm lengths by applying a slight bend to the two Mach-Zehnder fiber arms and monitoring the output until the $\pi$ phase difference is obtained. The assembly is then lightly tacked with a bonding agent on a planar silica substrate to provide structural stability.

The resultant product operates as a fiber coupler that is substantially independent of temperature effects. Specifically, the temperature stable Mach-Zehnder interferometer is as temperature-stable as a single fused coupler, with a measured variation in the splitting ratio of only 0.2 decibel over the −20° C. to +70° C. range. Although these devices are being made at CANSTAR with a 1 millimeter length, they can also be fabricated with lengths that could be as long as 2 centimeters, while retaining reasonable stability features.

Description of the Improvements in Accordance with the Present Invention

FIGS. 2A, 2B, 2C and 2D illustrate embodiments of an exemplary all-optical Mach-Zehnder fiber switch 200 constructed in accordance with the present invention. In each embodiment, the optical switch 200 receives an input signal at a wavelength $\lambda_s$ from a light source 205. The signal enters an input port of a first fiber arm 210 of the switch 200. A pump input source 215 transmits an optical pump signal at a wavelength $\lambda_p$ into an input port of a second fiber arm 220. The fibers used to construct the fiber arms 210, 220 (as well as the rest of the interferometer 200) are advantageously formed from silica fiber available, for example, from Corning, Inc. The two fiber arms 210, 220 are fused to form a coupler 230. After the coupler 230, the switch 200 branches into two an upper fiber arm 235 and a lower fiber arm 240 which are laid together in close contact at an interface 242. In the embodiment of FIG. 2A, for example, the fiber arms 235, 240 include respective nonlinear regions 245, 250 which may be produced, for example, by means of erbium, neodymium or ytterbium doping of the cores of the fibers in the regions 245, 250. In the embodiment of FIG. 2A, the doped regions 245, 250 are spliced into the fiber arms 235, 240 by fused splices 252, 254 in the upper arm 235 and fused splices 256, 258 in the lower arm 240.

In one advantageous embodiment, a thermally conductive grease (not shown) or another means of heat transfer is provided between the two arms 235, 240 in the interface 242 to improve thermal coupling between the two arms 235, 240. As will be discussed in greater detail below, improved thermal coupling reduces slow residual switching due to thermal gradients between the two arms 235, 240.

Further along the length of the fiber switch 200, another coupler 260 is produced by fusing the fiber arms 235, 240 according to the technique which is disclosed in U.S. Pat. No. 5,119,453. U.S. Pat. No. 5,119,453 is hereby incorporated by reference. Advantageously, the couplers 230, 260 are between 3–8 mm apart; however, lengths from 1 mm up to 2 cm may be used in specific applications. The distance between the couplers 230, 260 is represented by the distance "d" in FIG. 2. Finally, after the fused coupler 260, the fibers branch out into an upper output arm 265 and a lower output arm 270.

In operation, light at the wavelength $\lambda_s$ from the input source 205 enters the input port of the fiber arm 210 and is coupled, via the coupler 230, into both fiber arms 235, 240. Advantageously, the input light signal is split approximately equally between the two arms 235, 240 so that the coupler 230 provides substantially 50 percent coupling into each of the two arms 235, 240 with the phase of the light in the arm 240 leading the phase of the light in the arm 235 by $\pi/2$. Depending upon the phase difference between the two signal portions when the two signal portions reach the input of the coupler 260, the light will be coupled to one or both of the output ports 265, 270. If the two arms 235, 240 between the couplers 230, 260 are precisely equal in length and have the same propagation characteristics, then, as described above in connection with FIG. 1, the phase of the light in the arm 240 will continue to lead the phase of the light in the arm 235 at the coupler 260 by $\pi/2$, and the two portions of the input light signal will constructively recombine at the coupler 260 so as to exit via the output port 270. However, if the lengths of the arms 235, 240 are unequal, or if the propagation characteristics of the arms 235, 240 differ, the signals propagating through the two arms 235, 240 will incur a differential phase shift such that the phase of the light in the arm 240 no longer leads the phase of the light in the arm 235 by $\pi/2$ at the input to the coupler 260. If the two signal portions incur a differential phase shift of $\pi$ while the two signal portions are propagating in the arms 235, 240, then at the input to the coupler 260, the phase of the signal portion in the arm 235 leads the phase of the signal portion in the arm 240 by $\pi/2$, and the two signal portions combine constructively at the output port 265 so that substantially all of the combined signals will be coupled to the output port 265 while no appreciable signal light will exit at the port 270. If neither signal portion leads the other signal portion by precisely $\pi/2$, then a portion of the light will be coupled to the output port 265 and a portion of the light will be coupled to the output port 270.

As discussed above, the coupler 230 is preferably designed so that the input optical signal at the wavelength $\lambda_s$ is split substantially equally between the two arms 235, 240, and so that the optical pump signal at the wavelength $\lambda_p$ is caused to propagate in only one of the two arms 235, 240 (e.g., the lower arm 240 for the purpose of the present discussion). The arm 240 in which the pump signal propagates will be referred to herein as the pumped arm 240. The pump signal traveling through the pumped arm 240 changes the index in that arm due to nonlinearities in the nonlinear region 250. Therefore, there is a change in the phase in the optical signal traveling through the pumped arm 240 while there is no change in the phase of the optical signal traveling through the non-pumped arm 235. Thus, a differential phase shift is developed between the optical signals in the two arms. By adjusting the pump intensity so that the differential phase shift is $\pi$, the optical signal is caused to switch from one output to the other output.

As discussed above, for proper operation of the switch, the phase bias of the passive interferometer (i.e., with the pump off) must be adjusted to either 0 or $\pi$. Prior art teaches that if the phase bias is equal to $\pi$ (or equivalently $3\pi$, $5\pi$, etc., or $-\pi$, $-3\pi$, $-5\pi$, etc.), the switch exhibits a reduced sensitivity to external temperature fluctuations. On the other hand, if the phase bias is equal to 0 (or equivalently $2\pi$, $4\pi$, etc., or $-2\pi$, $-4\pi$, etc.), the switch exhibits a fairly strong sensitivity to external temperature fluctuations. See, for example, F. Gonthier, D. Ricard, S. Lacroix, and J. Bures, "Wavelength-flattened 2×2 splitters made of identical single-mode fibers," *OPTICS LETTERS*, Vol. 16, No. 15, pp. 1201–1203, August 1991, which demonstrates the wavelength independence of the two-coupler structure. The temperature dependence of the structure is based upon a similar principle.

Based on this observation, for applications in which the switch is mostly in the off state, i.e., which require that the pump is applied only a small fraction of the time, i.e., with a low duty cycle (less than 50%), it is essential to select a phase bias of $\pi$. In this manner, when the switch is in the off state (no pump), which is most of the time, the relative phase bias of the two arms is $\pi$, and it exhibits a reduced sensitivity to temperature variations. When the switch is in the on state (pump on), which is a small fraction of the time, the relative phase bias of the two arms is $2\pi$ (namely the no-pump phase bias of $\pi$ plus the $\pi$ phase shift induced by the pump), and the switch is more sensitive to temperature fluctuations. Thus, most of the time, the switch exhibits a reduced sensitivity to temperature fluctuations.

Conversely, for applications in which the switch is mostly in the on state, i.e., which require that the pump is applied a large fraction of the time, i.e., with a high duty cycle (greater than 50%), it is essential to select a phase bias of 0. In this manner, when the switch is in the on state (pump on), which is most of the time, the relative phase bias of the two arms is $\pi$ (namely the no-pump phase bias of 0 plus $\pi$ phase shift induced by the pump), and the switch exhibits a reduced sensitivity to temperature fluctuations. When the switch is in the off state (pump off), which is a small fraction of the time, the relative phase bias of the two arms is 0, and the switch is more sensitive to temperature fluctuations. Thus, again, most of the time, the switch exhibits a reduced sensitivity to temperature fluctuations.

If the switch is targeted to be operated with a duty cycle around 50%, the phase bias of the passive interferometer can be adjusted to either 0 or $\pi$.

In practice, adjustment of the phase bias of the passive interferometer can be done by slightly bending the two fibers located between the two couplers. The bend induces a stronger phase shift for the fiber that is in the outer part of the bend than for the fiber in the inner part of the bend. The radius of the bend is adjusted to produce the required phase difference between the two arms, i.e., the required phase bias. The bend can then be stabilized mechanically by bonding the bent fiber region onto a substrate, or by other means.

In the embodiment of FIG. 2A, both fiber arms 235, 240 are doped, i.e., exhibit a strong nonlinearity, whereas the couplers 230, 260, the input fibers 210, 220, and the output fibers 265, 270 are not doped. This can be accomplished by splicing the doped fiber arms 235, 240 to the passive fiber portions at the splices 252, 254, 256, 258 prior to fabricating the structure. Another fabrication method applicable, in particular, to color centers discussed in more detail below, is to irradiate with gamma rays the central region of the Mach Zehnder interferometer (and this region only) after fabricating the Mach Zehnder interferometer. In this way, color centers are induced only in the central region. The embodiment represented in FIG. 2A is beneficial because some color centers induce strong nonlinearities and because only the center fibers are doped and thus pump absorption does not occur in the input and output fiber leads, or in the couplers 230, 260. If dopant was present in the fiber leads and/or the couplers, pump absorption would be allowed to take place in these regions. The pump would then create a phase shift in these regions, but because this phase shift occurs outside of the Mach Zehnder interferometer, it would not result in any switching of the signal. Some pump power would just be lost.

In the configuration of FIG. 2A, only the cores of the two fiber arms 235, 240 are doped. In an alternate configuration (not shown) which would produce essentially the same performance, both the cores and the claddings are doped. In the latter case, either the entire claddings or only portions of the claddings can be doped.

In an alternative embodiment illustrated in FIG. 2B, the operation is the same as in FIG. 2A except that only one of the two fiber arms 235, 240 is doped (e.g., the bottom arm 240, which is pumped by the pump signal in FIG. 2B). This mode of operation is possible because only the bottom arm 240 is optically pumped. Thus, the other unpumped arm 235 does not need to be doped. It should be noted, however, that although this configuration operates well, it may be preferable to use the configuration of FIG. 2A when the dopant produces a significant change in the physical (in particular, thermal and optical propagation) properties of the fiber. Having both arms doped, as in FIG. 2A, then ensures that the two arms 235, 240 are essentially identical, and thus that they respond the same way to external temperature changes, and that the interferometer remains biased at the desired point.

In a further alternative embodiment of FIG. 2C, the entire Mach Zehnder interferometer 200 comprises fibers with doped cores. The doped lead fiber 220 and the fiber coupler 230 thus absorb some of the pump power before it arrives in the useful region 240. As mentioned earlier, the situation is not the most desirable from the standpoint of pump power, since the portion of pump power absorbed by the lead fiber 220 and the fiber coupler 230 is wasted, in the sense that the phase shift it produces does not contribute to any useful switching of the signal. However, it may be more practical to fabricate a switch as represented by FIG. 2C than as represented by FIG. 2A or 2B, because in the former there is no need to splice the doped fiber to the undoped fiber prior to fabricating the Mach Zehnder interferometer 200. Having no splices in the doped fiber eliminates additional signal and pump losses due to the splices. It is also easier in practice to fabricate the device with the two arms 235, 240 of identical lengths (to avoid the thermal problems described earlier) when no splices are present in the interferometer itself. The fabricated interferometric switch is then spliced to undoped input fibers 280, 281 via splices 282, 283 and to undoped output fibers 284, 285 via splices 286, 287 to incorporate the switch 200 into an optical fiber system (not shown).

To reduce pump absorption in the lead fiber 220 in FIG. 2C before entering the interferometer switch 200, the length of the lead fiber 220 is made as short as possible. Preferably, the splices 282, 283, 286, 287 are made prior to fabricating the fused couplers 230, 260 so that the splices can be made close to the location of the fused couplers 230, 260. The length of lead fiber 220 should be ideally significantly shorter than the length of the pumped arm 240 to guarantee that most of the light is absorbed in the pumped arm 240. To reduce pump absorption in fiber coupler 230, it is preferable to make coupler 230 a fused fiber coupler and to confine the dopant to the core region of the doped fiber throughout the device. In this fashion, as is well known in the art, light in the coupling region of the coupler 230 is guided by the combined cladding of the two fused fibers, i.e., its spatial overlap with the doped region is minimal and pump absorption is also minimal. It should be understood that this step, namely the use of a fused coupler and confining the dopant to the fiber core, is preferable, but is not essential to proper operation of the switch.

FIG. 2D illustrates a fourth configuration, which is nominally the same as the configuration of FIG. 2C, except that only one of the fibers (the fiber to be pumped) is doped. As discussed above with respect to the relationship between the configurations of FIGS. 2A and 2B, although the configuration of FIG. 2D operates well, it may be preferable to use the configuration of FIG. 2C instead when the dopant introduces a significant change in the physical (in particular, thermal) properties of the fiber. Having both arms doped, as in FIG. 2C, then ensures that the two arms 235, 240 are essentially identical, and thus that the two arms 235, 240 respond nominally the same way to external temperature changes, so that the interferometer bias remains stable.

As briefly mentioned above, one particularly preferred implementation employs color centers as a nonlinear dopant. The use of color centers as dopants is disclosed in R. W. Sadowski, et al., All-Optical Switching Using Color Centers in an Irradiated Phosphorus-Doped Fiber, *IEEE PHOTONICS TECHNOLOGY LETTERS*, Vol. 8, No. 7, July 1996, pp. 897–899. A primary advantage to color centers is that color centers can be induced externally after the fiber Mach-Zehnder switch 200 has been fabricated by simply irradiating the fiber arms (and not the fiber leads). Typically, color centers can be induced in a specially doped fiber by subjecting the fiber to gamma rays. The fiber leads are not irradiated so that they do not absorb the pump. This is ideal, since the pump should only be absorbed where it is needed (i.e., inside the fiber Mach-Zehnder). Lower pump powers can therefore be employed because substantially all of the pump signal is absorbed in the nonlinear region 250, which induces a phase change in the portion of the input signal propagating through the arm 240.

When employing dopants other than color centers, the fiber used to make the Mach-Zehnder 200 is typically doped at the outset with an appropriate dopant such as erbium, ytterbium or neodymium. In this case, since the entire interferometer (including the leads) is doped, the leads (i.e., the input arms 210, 220) would have to be very short to prevent excessive absorption of the pump prior to being coupled to the interferometer, as discussed above in connection with FIGS. 2C and 2D.

Another important aspect of the preferred embodiment of the invention is the reduction of pump-induced thermal phase shift in the device by placing a heat conductor over the two fiber arms between the two couplers (e.g., the thermally conductive grease mentioned above). The conductor provides a path for the heat to flow from the pumped fiber to the unpumped fiber, thus reducing the pump-induced temperature gradient and reducing the undesirable thermal phase shift between the arms 235, 240. Alternatively, the two fibers can be lightly fused together (over only the cladding region so as not to couple light between the arms 235, 240) along the length of the two arms. Lightly fusing the fiber arms 235, 240 also provides additional mechanical stability.

Because the Mach-Zehnder fiber switch 200 is constructed to have a very small distance between the couplers 230, 260, the switch 200 is highly temperature stable. However, when relying on the Kerr effect to produce the required phase shift, the use of short fiber arms between the couplers 230, 260 presents a further difficulty. That is, it has been found that a very high pump power is typically necessary to induce a sufficiently high differential phase shift (i.e., a phase shift of approximately $\pi$ radians) within a short fiber length. With the Kerr effect, the differential phase shift that can be induced in the optical signal is proportional to the fiber length. Specifically, the dependence of the phase differential $\delta\phi$ can be expressed mathematically according to the following equation:

$$\delta\phi = \frac{2\pi \times n_2 \times I_p \times l}{\lambda_s} \qquad (1)$$

where $l$ is the fiber length, $n_2$ is a measure of the nonlinearity due to the Kerr effect, and $I_p$ represents the intensity of the input pump energy.

Given the wavelength of the signal input (about 1500 nanometers) and the nonlinearity of standard silica fiber, the approximate product of power and fiber length required to accomplish full switching can be calculated as approximately 700 wattmeters. Thus, from the above equations it can be seen that fiber arms having a short length require a high pump power to induce the necessary phase shift to ensure proper switching operation of the Mach-Zehnder switch 200. In a typical short Mach-Zehnder design as described above, with the Kerr effect already present in the undoped silica fiber, such a short length (for example, on the order of 1 mm) of the fiber arms between the couplers would require on the order of 700 kW of peak pump power to accomplish full switching. This power is prohibitively high for practical applications and would also destroy the fiber input end 220.

In accordance with the preferred embodiment of the present invention, a high concentration of dopant is added to one or both of the fiber arms 235, 240 within the regions 245, 250 (FIG. 2A or FIG. 2B) in order to enhance the nonlinearity of the fiber through these regions. The nonlinear region 250 will absorb the pump power and generate a $\pi$ nonlinear phase shift as required to produce full switching over the short length available (a couple of centimeters or less) in the Mach-Zehnder switch 200. For example, by introducing the proper dopant and concentration, the nonlinearity in the region 250 can be enhanced to a sufficient level so that only about 1 milliwatt of pump power is necessary to accomplish full switching. In practice, doping concentrations, length and nonlinearity that permit switching power up to approximately 100 milliwatts would also be acceptable. Doping concentrations at the levels called for can be provided using techniques described in R. H. Pantell, et al., Analysis of Nonlinear Optical Switching in an Erbium-Doped Fiber, *JOURNAL OF LIGHTWAVE TECHNOLOGY*, Vol. 11, No. 9, September 1993, pp. 1416–1424.

In certain exemplary embodiments, the fiber arms 235, 240 can be doped using erbium, ytterbium or neodymium dopants, as well as by use of color centers. The concentrations for ytterbium, erbium or neodymium dopants may be on the order of 50,000 parts per million to ensure that the pump power required for switching is absorbed over a sufficiently short length of fiber (e.g., under approximately one centimeter).

Color centers, which are essentially light absorbing defects in the fiber induced by irradiation of the fiber, may be particularly advantageous in some embodiments due to the high absorptivity and fast switching properties of color centers. As briefly described above, when pump light is injected into a nonlinear region of an optical waveguide, the index of refraction changes because electrons are elevated to a higher energy level due to the absorption of the pump light. Once the pump light is turned off, the electrons fall back to their original energy level, thus restoring the original index of refraction of the waveguide. It is an observed property of color centers that the electrons fall back to the ground state very quickly so that the switching from one index of refraction to another (and, therefore, the switching of light from one output port to another) occurs very quickly. Furthermore, the color centers are highly absorptive and can absorb a given power over shorter distances than many other types of dopants.

Color centers can be produced by starting with a fiber doped with a suitable material and irradiating the fiber with gamma rays for an amount of time selected to provide a sufficient concentration of color centers. In one particular example, producing nonlinearities by use of color centers is typically accomplished by predoping the fiber with phosphorous oxide ($P_2O_5$) before irradiating the fibers with gamma rays. The resulting fibers include phosphorous oxygen hole centers (POHC) which absorb light in the infrared spectrums in the wavelength range of 750 nm. The concentration of color centers is determined by the concentration of the original dopant (i.e., the color center precursor) and the gamma ray dosage, which are selected to obtain a sufficient concentration of color centers over the length of the MachZehnder fiber switch. One difficulty that has been encountered with color centers, however, is that some color centers photo-bleach so that after some period of time the color centers no longer are effective at absorbing the pump power. Thus, it is desirable to produce color centers of a permanent character which are resistant to photo bleaching.

Figure 3:
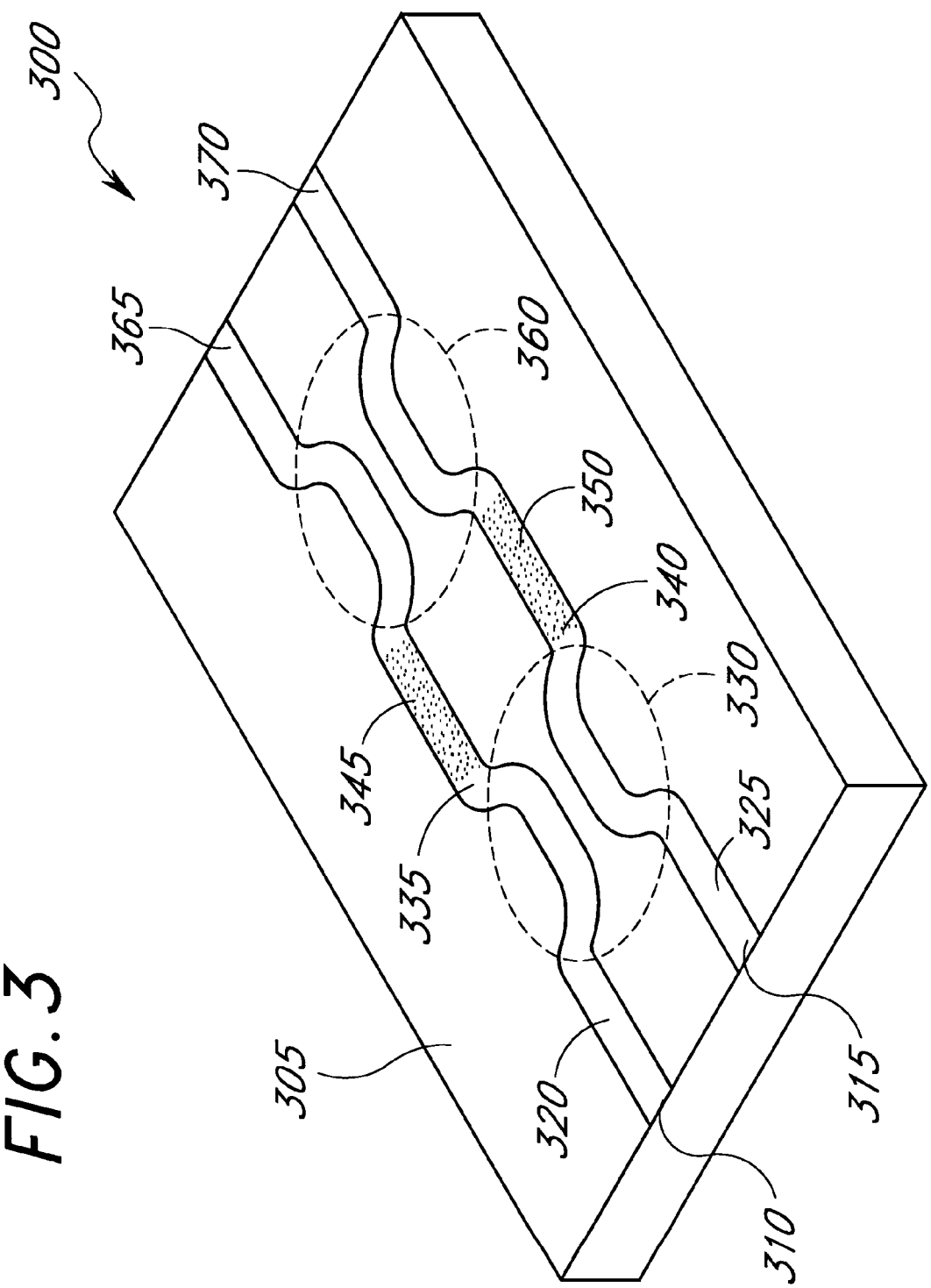
FIG. 3 illustrates an alternative embodiment of the invention manufactured as an integrated optics switch.

An alternative embodiment of the invention is depicted in FIG. 3. As shown in FIG. 3, an integrated optics Mach-Zehnder switch 300 is formed on silica or on silica grown on a silica substrate 305. The integrated optics Mach-Zehnder switch 300 has substantially the same dimensions as the fiber Mach-Zehnder switch 200. As shown in FIG. 3, the integrated optics Mach-Zehnder switch 300 includes input ports 310, 315, which couple to corresponding input arms 320, 325. A coupler 330 is formed within the substrate 305 where the arms 320, 325 meet. After the coupling portion 330, the integrated optics Mach-Zehnder switch 300 branches into separate arms 335, 340 which are advantageously adjacent or very close to one another to provide good thermal coupling between the arms 335, 340. Further masking can be used to dope one or both of the arms 335, 340 in regions 345, 350, respectively. Thereafter, another coupler 360 is formed 1 mm to 2 cm from the coupler 330. Finally, the integrated optics Mach-Zehnder switch 300 branches out into a pair of output ports 365, 370. It should be understood that other materials can be used in place of silica.

The operation of the integrated optics Mach-Zehnder switch 300 is substantially similar to that of the fiber Mach-Zehnder switch 200. Of course, it will be appreciated by those of ordinary skill in the art that those techniques specific to the use of integrated optics waveguides, such as the coupling of fiber leads to the input ports 310, 315 and the output ports 365, 370, etc., are used with the switch 300.

Figure 4A:
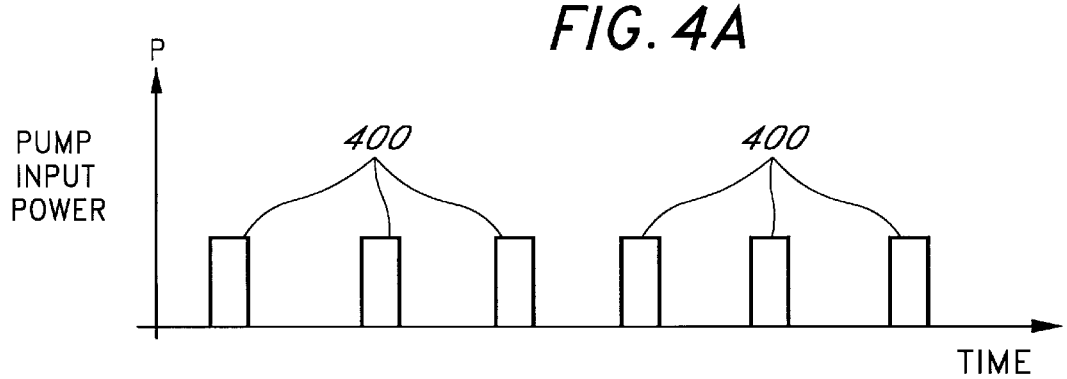
FIG. 4A is a timing diagram illustrating the input pump power pulsed over time.
Figure 4B:
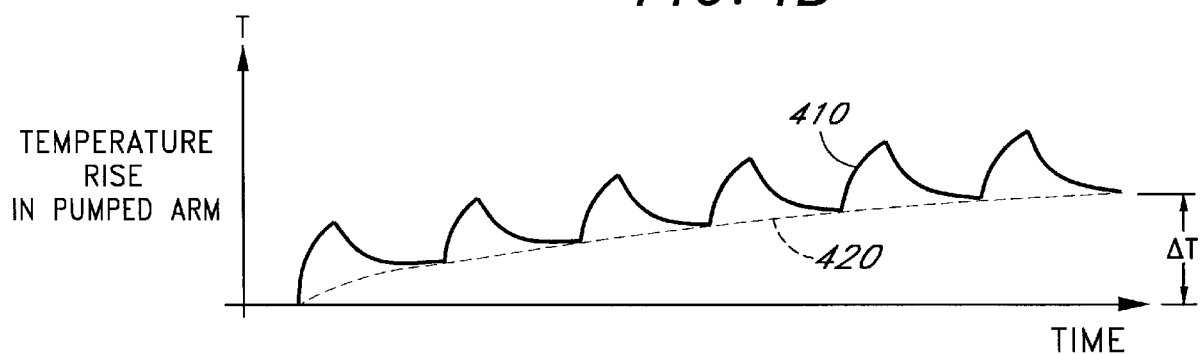
FIG. 4B illustrates the temperature gradients observed within the pumped arm as pump power is applied to the Mach-Zehnder interferometer.
Figure 4C:
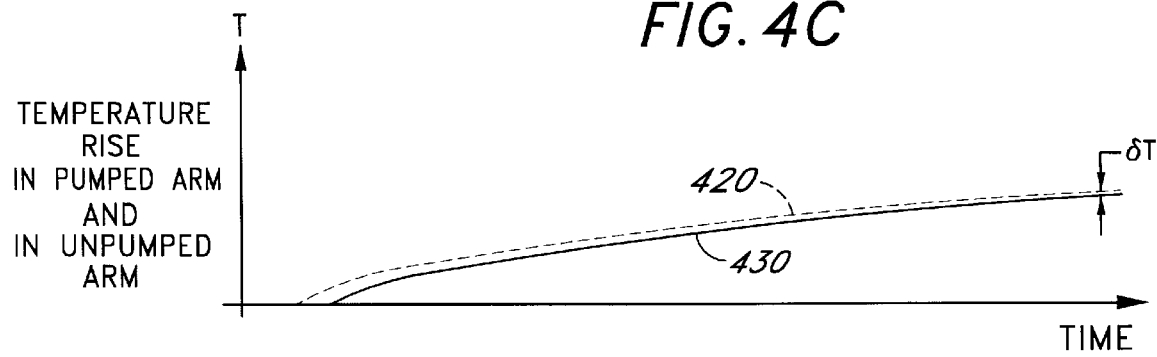
FIG. 4C illustrates a coupling of thermal energy from the pumped arm to the nonpumped arm during operation of the Mach-Zehnder interferometer.

FIGS. 4A–4C illustrate the effect of pump-induced heat on the propagation paths between the couplers due to the pump input power. In particular, as represented by pulses 400 in FIG. 4A, the pump input signal is pulsed periodically so that a sudden power input is provided to the Mach-Zehnder switch 200 (or 300) each time the pump input light source is pulsed. The effects of this pulsing pump input on the temperature within the pumped arm 240 of the switch 200 in FIGS. 2A–2D is shown by a temperature curve 410 in FIG. 4B. As depicted in FIG. 4B, the first pump input pulse results in a sudden increase in temperature in the pumped arm 240, since the energy from the pulse is absorbed by the doped region 250 within the pumped arm 240. Although some of the energy from the input pump signal is used to elevate the energy levels of electrons within the pumped arm 240, thereby changing the refractive index propagation properties of the pumped arm 240, the electrons may fall back to the ground state partly by nonradiative processes and radiate heat in response to this transition back to the lower energy state. This accounts for the existence of temperature transients in the pumped arm 240. Typically, the temperature in the pumped arm 240 is observed to rise over the duration of the pump input pulse and to slowly decay after the pump pulse as heat radiates into the environment surrounding the Mach-Zehnder switch 200. If the time period between the input pump pulses is sufficiently short, then not all of the heat will have dissipated from the core of the pumped arm 240 when the next pulse arrives, so that the next pulse initiates another increase in temperature. The peak temperature in the core of the pumped arm 240 after the second pulse will be slightly higher than the peak temperature in the core of the pumped arm 240 after the first pulse. This pattern is repeated until a balance is reached after many pulses between the heat which is dissipated and the heat which is generated within the pumped arm 240. Thus, this steady increase in temperature is depicted in FIG. 4B as a stair-step like pattern of increasing and decaying temperature. A dashed curve 420 in FIG. 4B shows the baseline increase in temperature. This baseline increases gradually as the number of applied pump pulses increases, and eventually reaches a steady state value, labeled $\Delta T$ in FIG. 4B. Although for the sake of clarity, the temperature curve 420 in FIG. 4B is shown as approaching the steady state value $\Delta T$ after a few pump input pulses, it will be appreciated that in practice, hundreds or thousands of pulses (or even more) may be required to reach this steady state value. For this reason, unlike the example shown in FIG. 4B, the steady state value $\Delta T$ is much larger than the increase in temperature due to a single pump pulse.

If the two arms are not thermally coupled, e.g., if the two arms 235, 240 are thermally far apart, only the pumped arm 240 heats up. As a result, the index of refraction of the pumped arm 240 changes (because both its length and index depend on temperature). However, unpumped arm 235 does not experience this index change. Consequently, the optical signal experiences an additional phase shift due to this heating imbalance (the other phase shift being the nonlinear phase shift). This thermal phase shift is detrimental because it changes the balance of the interferometer. If it changes in a time-independent way, it could be offset by applying a correcting phase shift between the two arms 235, 240; however, the thermal phase shift is time dependent. Thus, the solution of the present invention is to enhance the heat transfer between the arms 235, 240 so that the two arms are maintained at substantially the same temperature.

FIG. 4C illustrates the advantages associated with a preferred embodiment of the present invention wherein effective heat coupling is provided between the arms of the Mach-Zehnder switch 200. A curve 420 of FIG. 4C represents the temperature rise generated in the pumped arm 240 and is substantially the same as the curve 420 depicted in FIG. 4B. A curve 430 is representative of the temperature rise in the unpumped arm 235 due to transfer of heat from the pumped arm 240 to the unpumped arm 235. Although the temperature curve 430 is shown in FIG. 4C as approaching the average temperature rise after a few pump input pulses, again it will be appreciated that in practice, hundreds or thousands of input pulses (or even more) may be required to elevate the unpumped arm 235 to an average temperature level which is substantially the same as the average temperature of the pumped arm 240. By coupling heat to the unpumped arm 235 from the pumped arm 240, after a sufficient number of pulses, substantially the same temperature baseline is observed in both arms, so that the only temperature difference between the two arms arises only from the short bursts which occur during each pump input pulse. Thus, a fairly small and manageable, transient temperature difference is observed at each pulse between the two arms 235, 240. If poor temperature coupling exists between the two arms 235, 240, then the difference in temperature between the two arms will be approximately equal to the absolute magnitude of the temperature rise depicted in FIG. 4B. This value is represented in FIG. 4B as $\Delta T$. In contrast, the maximum temperature variation between the two arms 235, 240 where good heat coupling is present, is represented in FIG. 4C as $\delta T$, which is typically substantially less than $\Delta T$.

In summary, the present invention has combined existing concepts and technologies which were not originally intended to be used together to produce a temperature-stable, nonlinear fiber switch which does not require active stabilization.

Although the preferred embodiments of the present invention have been described in detail above, it will be appreciated by those of ordinary skill in the art that certain obvious modifications and adaptations of the invention could be made without departing from its spirit or central characteristics. For example, several types of doping agents in sufficiently high concentrations could be used to dope the pumping arm of the Mach-Zehnder switch. Furthermore, slight variations in the manufacturing techniques for the fiber or integrated optics switches could be made without departing from the essence of the invention. Accordingly, the scope of the invention should be defined in light of the following appended claims.

What is claimed is:

1. An optical switch comprising:
   a first optical coupler which receives an optical signal and a pump signal as inputs and which provides first and second coupled outputs;
   a first optical waveguide in optical communication with said first coupled output, said first optical waveguide having a first portion of said optical signal propagating therethrough;
   a second optical waveguide in optical communication with said second coupled output, said second optical waveguide having said pump signal and a second portion of said optical signal propagating therethrough, said first optical waveguide and said second optical waveguide having lengths sufficiently short to be thermally stable, said second optical waveguide further having a sufficient nonlinearity to produce a relative phase shift difference of said second portion of said optical signal with respect to said first portion of said optical signal of 180° with low pump power; and
   a second optical coupler which receives said first and second optical waveguides as inputs and which provides first and second output ports.

2. An optical switch as defined in claim 1, wherein said second optical waveguide is between one millimeter and one centimeter, and said pump power is on the order of 1–10 milliwatts.

3. An optical switch as defined in claim 1, wherein said first and second optical waveguides are optical fibers.

4. An optical switch as defined in claim 1, wherein said first and second optical waveguides are formed within an integrated optics substrate.

5. An optical switch as defined in claim 1, wherein said first and second optical couplers are fused fiber couplers.

6. An optical switch as defined in claim 1, wherein the lengths of said first and second optical waveguides are less than 2 centimeters.

7. An optical switch as defined in claim 1, wherein the lengths of said first and second optical waveguides are on the order of 1 millimeter.

8. An optical switch comprising:
   a first optical coupler which receives an optical input signal and a pump input signal as inputs and which provides first and second coupled outputs;
   a first optical waveguide in optical communication with said first optical coupler to receive said first coupled output, said first optical waveguide having a first portion of said optical input signal propagating therethrough;
   a second optical waveguide in optical communication with said first optical coupler to receive said second coupled output, said second optical waveguide having said pump signal and a second portion of said optical input signal propagating therethrough, said first optical waveguide and said second optical waveguide having lengths sufficiently short to be thermally stable; and
   a second optical coupler which receives light from said first and second optical waveguides as inputs and which selectively provides an optical output signal to first and second output ports in response to said light, and wherein said second optical waveguide has a sufficient nonlinearity to induce a phase shift differential between said first and second portions of said optical input signal to cause substantially complete switching of said optical output signal from said first output port to said second output port when a low input power of said pump signal is provided.

9. An optical switch as defined in claim 8, wherein said second optical waveguide is between one millimeter and one centimeter, and said pump power is on the order of 1–10 milliwatts.

10. An optical switch as defined in claim 8, wherein said first and second optical waveguides are optical fibers.

11. An optical switch as defined in claim 8, wherein said first and second optical waveguides are formed within an integrated optics substrate.

12. An optical switch as defined in claim 8, wherein said first and second optical couplers are fused fiber couplers.

13. An optical switch as defined in claim 8, wherein the lengths of said first and second optical waveguides are less than 2 centimeters.

14. An optical switch as defined in claim 8, wherein the lengths of said first and second optical waveguides are on the order of 1 millimeter.

15. A temperature-stable, fiber, Mach-Zehnder optical switch comprising:
   a Mach-Zehnder interferometer having an input signal propagating therethrough so that a first portion of said input signal is coupled to a first output port and a second portion of said input signal is coupled to a second output port, a ratio between the power in said first portion and the sum of the powers in said first portion and said second portion defining a coupling ratio, said interferometer having a temperature stability such that over a range of approximately 0° C. to 50° C. said coupling ratio does not vary more than about 0.2 dB; and a pump input source which supplies an input pump signal that effects a change in said coupling ratio to provide optical switching, said temperature stability of said interferometer being maintained in the presence of said pump signal without requiring active stabilization.

16. An optical switch as defined in claim 15, wherein said temperature stability of said interferometer is such that over a range of approximately −20° C. to 70° C. said coupling ratio does not vary more than about 0.2 dB.

17. A fiber, Mach-Zehnder interferometer for use as an all-optical switch, said interferometer comprising:

a first coupler which receives an optical input signal and a pump signal, said first coupler coupling light to first and second fiber arms;

a second coupler in optical communication with said first coupler via said first and second fiber arms, said first and second fiber arms defining optical propagation paths between said first and second couplers having lengths sufficiently short to be thermally stable; and first and second output ports in optical communication with said second coupler;

wherein said first fiber arm is doped with a dopant having a doping concentration sufficient to effect full switching of said optical input signal from said first output port to said second output port when pump power on the order of 1–10 milliwatts is applied to said first fiber arm.

18. The interferometer as defined in claim 17, wherein said second fiber arm is also doped with said dopant.

19. The interferometer as defined in claim 17, wherein said second fiber arm is undoped.

20. The interferometer as defined in claim 17, wherein:

said first coupler and said second coupler are formed on first and second optical fibers;

said first fiber arm comprises a portion of said first optical fiber between said first coupler and said second coupler;

said second fiber arm comprises a portion of said second optical fiber between said first and second couplers; and said first optical fiber is doped with said dopant to thereby dope said first fiber arm.

21. The interferometer as defined in claim 20, wherein said second optical fiber is undoped.

22. The interferometer as defined in claim 17, wherein:

said first coupler and said second coupler are formed on first and second optical fibers;

said first fiber arm comprises a portion of said first optical fiber between said first coupler and said second coupler;

said second fiber arm comprises a portion of said second optical fiber between said first and second couplers;

said first optical fiber is doped with said dopant to thereby dope said first fiber arm; and said second optical fiber is doped with said dopant to thereby dope said second fiber arm.

23. The interferometer as defined in claim 17, wherein said first fiber arm and said second fiber arm are thermally coupled by a thermal path therebetween.

24. The interferometer as defined in claim 17, wherein said dopant is erbium and has a concentration on the order of 50,000 parts per million.

25. The interferometer as defined in claim 17, wherein said dopant is neodymium and has a concentration on the order of 50,000 parts per million.

26. The interferometer as defined in claim 17, wherein said dopant is ytterbium and has a concentration on the order of 50,000 parts per million.

27. An optical switch as defined in claim 17, wherein the lengths of said optical propagation paths are less than 2 centimeters.

28. An optical switch as defined in claim 17, wherein the lengths of said optical propagation paths are on the order of 1 millimeter.

29. A fiber, Mach-Zehnder interferometer for use as an all-optical switch, said interferometer comprising:

first and second couplers which split and recombine an optical signal propagating through said interferometer, said first and second couplers having a propagation path therebetween, said propagation path having a length sufficiently short to be thermally stable; and a fiber arm within said propagation path having a non-linearity sufficient to effect full switching of said optical signal at an output of said second coupler using a pump signal having an input power which is low enough to ensure that no damage is caused to said interferometer and to ensure that no deleterious thermal effects are observed.

30. An optical switch as defined in claim 29, wherein the length of said propagation path is less than 2 centimeters.

31. An optical switch as defined in claim 29, wherein the length of said propagation path is on the order of 1 millimeter.

32. In a short, fiber, Mach-Zehnder interferometer having first and second couplers, wherein a distance along a propagation path between said first and second couplers is sufficiently short to be thermally stable, a method comprising the steps of:

inputting an optical input signal into a first port of said interferometer;

inputting a pump switching signal into a second port of said interferometer; and controlling the energy of said pump switching signal to effect switching of said optical input signal from one output port to another output port of said interferometer, thereby using said interferometer as an all-optical switch.

33. An optical switch as defined in claim 32, wherein the length of said propagation path is less than 2 centimeters.

34. An optical switch as defined in claim 32, wherein the length of said propagation path is on the order of 1 millimeter.

* * * * *

UNITED STATES PATENT AND TRADEMARK OFFICE
CERTIFICATE OF CORRECTION

PATENT NO.   : 5,920,666                                       Page 1 of 1
DATED        : July 6, 1999
INVENTOR(S)  : Michel J.F. Digonnet et al.

It is certified that error appears in the above-identified patent and that said Letters Patent is hereby corrected as shown below:

Column 1,
Before "BACKGROUND OF THE INVENTION", please insert the following caption and paragraph:
-- GOVERNMENT SUPPORT
This invention was made with Government support under contract DE-FG03-92ER12126 awarded by the Department of Energy. The Government has certain rights in this invention. --

Signed and Sealed this

Twenty-first Day of May, 2002

Attest:

JAMES E. ROGAN
*Attesting Officer*    *Director of the United States Patent and Trademark Office*